May 12, 1953    H. E. DYCHE, JR., ET AL    2,638,579

STALL WARNING APPARATUS FOR AIRPLANES

Filed June 1, 1948

WITNESSES:
Robert C. Baird
Jno. C. Groome

INVENTORS
Howard E. Dyche, Jr. and
Gilbert P. Cardwell.
BY
G. M. Crawford
ATTORNEY Patented May 12, 1953

2,638,579

UNITED STATES PATENT OFFICE 2,638,579

STALL WARNING APPARATUS FOR AIRPLANES

Howard E. Dyche, Jr., Pittsburgh, Pa., and Gilbert P. Cardwell, Detroit, Mich., assignors to Westinghouse Electric Corporation, East Pittsburgh, Pa., a corporation of Pennsylvania Application June 1, 1948, Serial No. 30,307

7 Claims. (Cl. 340—27)

Our invention relates, generally, to indicators or warning apparatus and, more particularly, to warning apparatus for use on airplanes to warn the pilot of an incipient stall condition by means of visual and/or audible signals.

It is known that under normal conditions of flight, the flow of air over the upper surface of the wing of a plane is smooth or laminar except for the relatively thin boundary layer of air at the wing surface and under an incipient stall condition, the laminar flow of air changes to a turbulent flow. This turbulence begins at the trailing edge of the wing and progresses forwardly which decreases the vertical component of force or lift of the wing. As the lift decreases, approaching the weight of the plane, a complete stall ensues. In other words, regardless of the initial causes, an aerodynamic stall is always caused and preceded by this change from laminar to turbulent air flow over the upper surface of the wing.

Apparatus of various kinds has been employed to warn the pilot of an incipient stalling condition, some of which operates at a definite angle of attack and may be of a mechanical nature and other of which respond to the change in air flow conditions or characteristics over the upper surface of the wing and may be of an electrical or electro-thermal type. The latter type responds to a pressure differential as determined by air flow conditions or characteristics over the upper surface of the wing. It is to this latter general type of system or devices that our invention is directed.

Accordingly, it is an object of our invention, generally stated, to provide stall warning apparatus for airplanes which shall be of simple and economical construction, reliable and accurate in operation, and which shall respond only to the change from laminar to turbulent air flow over the upper surface of the wing and not be materially affected by changes in ambient temperature, icing, vibration, or the position in which the apparatus is operated.

A more specific object of our invention is to provide apparatus of the character described which shall function in accordance with a predetermined change in the nature of the air flow over the upper surface of the wing to warn the pilot of an incipient stalling condition.

A further object of our invention is to provide apparatus of the character described which is responsive to a pressure differential supplied by a pressure differential device mounted upon the upper surface of the wing adjacent the trailing edge thereof and which embodies a control switch actuated by the expansion and contraction of an expansible member, the temperature of which is varied or controlled in accordance with the pressure differential.

Another object of our invention is to provide apparatus of this type wherein the expansion and contraction of the expansible member in the form of a wire is controlled by passing a heating current through the wire which is controlled by a pressure switch including a sensitive bellows for actuating the movable contact member thereof and which is actuated by the air pressure produced by a suitable pressure differential device.

A still further object of our invention is to provide a stall detecting device for use on airplanes which is responsive to the change in air flow conditions over the upper surface of the wing and which embodies a control switch for controlling the energization of an electrically operated warning device and which, in turn, is controlled by an expansible member, the temperature of which is controlled by a pressure switch.

These and other objects of our invention will become more apparent from the following detailed description of a particular embodiment thereof when considered in connection with the drawing, in which.

In practicing our invention, the control switch which controls the energization of the signalling device, which may be a lamp or a horn or both, from a battery or generator on the airplane, is actuated by an expansible wire heated by passing electric current therethrough under certain conditions. The heating current for the wire is controlled by a pressure switch including a sensitive bellows mounted in an air-tight housing and subjected to a pressure differential by a suitable pressure differential device in the form of a head or blister mounted upon the upper surface of the wing adjacent the trailing edge thereof. The arrangement is such that all of the control elements of the device are preferably mounted inside the wing in the air-tight container or housing, one opening in the pressure differential device communicating with the interior of the housing and the other opening with the interior of the bellows of the pressure switch. Under normal flight conditions, the pressure switch is subjected to maximum pressure differential and the contacts controlling the heating of the wire are open. The wire being in a cooled condition is contracted and holds the control switch of the signalling or warning device in an open position. As the wing approaches a stalling condition, the pressure differential to which the bellows is subjected decreases to such an extent that the bellows expands sufficiently to close the switch and cause current to flow in the expansible wire. When the wire heats from this current, it expands sufficiently to permit the control switch to operate and close the circuit to the signalling device or devices. The control switch is so connected that it opens the heating circuit for the expansible wire at the same time it closes the circuit to the signalling device. The wire cools and contracts to such extent as to open the control switch. If the stall condition still exists, the operating cycle is repeated so that the signalling device in the plane is operated in a cyclic manner so long as the stalling condition exists.

Figure 1:
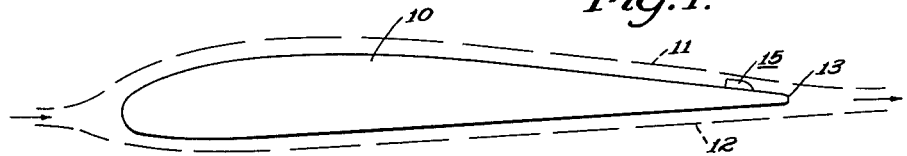
Figure 1 is a diagrammatic view showing the conditions of air flow over an airplane wing during normal flight conditions.
Figure 2:
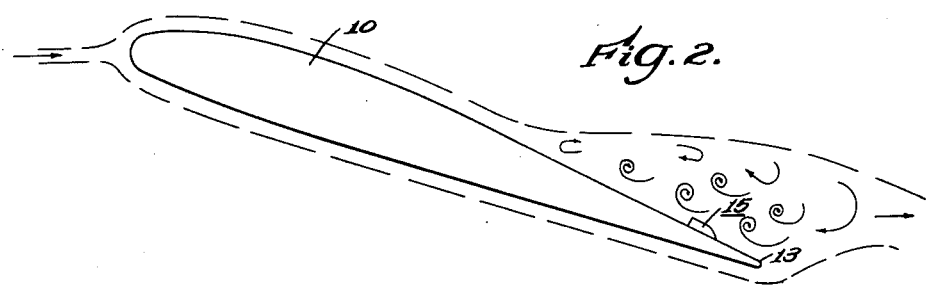
Fig. 2 is a similar view showing the conditions of air flow under an incipient stalling condition, showing in particular the turbulence in the vicinity of the trailing edge of the wing.

Referring now to Figs. 1 and 2 of the drawing, there is shown in Fig. 1 a section of an airplane wing or air foil 10 showing the direction of air flow thereover by means of the broken lines 11 and 12. It will be noted that the air flow is smooth or of a laminar nature, particularly over the upper surface of the wing in the region of its trailing edge 13.

Referring to Fig. 2 which shows the same wing disposed at an angle of attack which is approaching or is in a stalling condition, it will be observed that the air flow in the region of the trailing edge 13 has changed to a turbulent flow. This area begins at the trailing edge and increases progressing forwardly and in a spanwise direction to a degree where the lift of the wing is decreased to such extent as to create the stalling condition. Our system and apparatus function in response to this change in air flow conditions to warn the pilot of the stalling condition.

Figure 3:
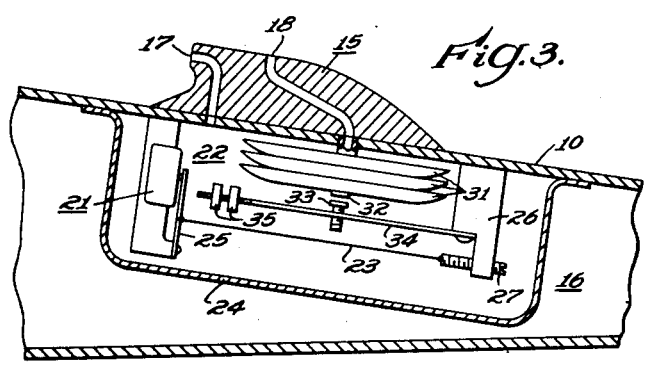
Fig. 3 is a side elevational view, partly in section, of the stall detecting device embodying the principal features of our invention and which is used in the complete system of our invention.

Referring to Fig. 3, there is shown a section of the wing 10 to which the stall detecting device of our invention is applied. This device comprises, generally, a pressure differential device 15 and a switch device 16. The pressure differential device is shown in a form known as a pressure differential head which is adapted to be mounted upon the upper surface of the wing adjacent the training edge thereof in the general position shown in Figs. 1 and 2. This device functions in response to the flow of air thereover to supply a pressure differential, and when connected to a device which responds to air pressure or air flow, produces the necessary air pressure or air flow therein. As shown, the head has an inlet opening 17 in the front face thereof facing the direction of flight and which communicates with the interior of the switch device. It has an outlet opening 18 in the top thereof and disposed at generally right angles to the inlet opening connected to an element of the switch device 16, as will be described more in detail hereinafter.

It is to be understood that any suitable type of pressure differential device may be utilized so long as it functions to produce a pressure differential in accordance with the air flow conditions over the upper surface of the wing. The particular device illustrated is one of the three devices shown in the copending application of Howard E. Dyche, Jr., filed June 1, 1948, Serial No. 30,306, now Patent No. 2,590,521. Reference may be made to that application for a more complete description of the nature and operation of the pressure differential device 15.

The switch device 16 comprises, generally, a control switch 21, a pressure switch 22, and an expansible member in the form of a wire 23 enclosed by an airtight housing 24. In this instance, the housing and other components of the switch device 16 are shown as being attached to the undersurface of a top section of the wing, but it is to be understood that they also may be mounted on a suitable mounting plate so as to provide a separate element, but connected with pressure head by suitable hoses or tubes.

The control switch 21 may be of any suitable type, but preferably of the low-travel variety, and, as shown, it is a single pole, double throw switch of known construction having a spring operating member 25 which in its normal position closes the switch in one direction.

In this instance, the position of the contact elements of the control switch 21 are determined by the length of the expansible wire 23 which is connected at one end to the spring operating member 25, and at its other end to a suitable bracket or support 26 by an adjusting screw 27.

It will be understood that when the expansible wire 23 is in a cold condition, that is, when it is subjected to normal or ambient temperature within the housing, it will be contracted and may be properly adjusted to hold the spring operating member 25 of the control switch in such position that the control contact members thereof in the warning circuit will be open. It will be apparent that when the wire 23 is heated, it will expand to such extent as to permit the spring operating member 25 to actuate the control switch to close the control contact members thereof in the warning circuit.

In order to provide for controlling the expansion of the wire 23 in accordance with the change in air flow conditions over the upper surface of the wing, use is made of the pressure switch 22. This switch comprises a sensitive bellows device 31, or other sensitive pressure responsive device, such as a diaphragm or the like, which carries a movable contact member 32. The bellows is rigidly mounted in the usual manner and the interior thereof is connected with the outlet opening 18 of the head, as shown.

It will be apparent that since the outside of the bellows is subjected to the pressure developed at the inlet opening 17 of the head and the interior of the bellows is connected to the outlet opening 18, it will remain in a contracted position, as shown, under normal flight conditions during which time the pressure differential supplied by the head 15 is at a maximum.

Under an incipient stalling condition, however, as illustrated in Fig. 2, the pressure differential changes in accordance with the change in air flow conditions. This change or decrease is such as to cause the bellows 31 to expand in the direction of its normal or free position and cause contact member 32 to engage contact member 33. Contact member 33 may be termed a fixed contact member but, in this instance, it is mounted upon a flexible support arm 34 provided at its outer or free end with adjustable counterweights 35. The purpose of this arrangement is to maintain the necessary fixed adjustment between the contact members under certain conditions.

The bellows device 31 is sensitive to pressure changes but has also a certain amount of expanding and contracting motion caused by its own weight and its position relative to the pull of gravity. Under the pull of gravity alone both the fixed contact member 33 mounted, as shown, and the movable contact member 32 carried by the bellows device have the same deflection or movement. It is to be understood, of course, that when the bellows device is actuated by a change in pressure differential, the contact members 32 and 33 are actuated into or out of engagement.

Figure 4:
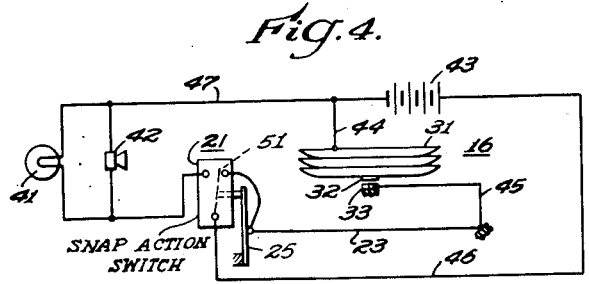
Fig. 4 is a diagrammatic view of the stall warning system embodying the stall detecting device of Fig. 3, showing how it may be employed to control the signalling devices.

Referring now to Fig. 4 which is a diagrammatic view of the stall warning system showing the switch device 16 in schematic form, it will be observed that the system shown comprises an indicating lamp 41, and an electrically-operated horn 42 disposed to be energized from a battery 43 or any other suitable source of current on the plane.

The control switch 21 is illustrated as a snap-acting switch and is shown as being held in its open position, insofar as the warning circuit is concerned, by the expansible wire 23 which is in a normally cool and contracted condition. It is to be understood that when the wire 23 expands upon an increase in the operating temperature thereof, the switch 21 automatically snaps to the closed position which is opposite to that shown. This would be the normal condition of the switch if it were not held in an open position by the tension or pull of wire 23.

When an incipient stalling condition is reached and contact members 32 and 33 of the pressure switch is closed, an obvious energizing circuit is established for the expansible wire 23. This circuit extends from the negative terminal of the battery 43, through conductor 44, contact members 32 and 33, conductor 45, the wire 23, switch 21, and conductor 46 to the positive terminal of the battery. This causes the current to flow through the wire 23 which heats it and permits it to expand sufficiently to permit the control switch 21 to snap to its opposite or closed position.

When this occurs the lamp 41 and the horn 42 are connected directly across the battery through conductor 47, the control switch 21 in its closed position, and conductor 46. This, of course, energizes the indicating lamp and horn to warn the pilot of the incipient stalling condition.

Simultaneously with the energization of the warning devices, the control switch 21, when released to its closed position, interrupts the heating circuit through the wire 23 at contact member 51 and the wire cools and contracts even though the contact members 32 and 33 of the bellows actuated switch are still closed. This actuates the control switch to the open position, as shown, to interrupt the operation of the signalling devices and again commence the heating cycle of the wire 23. When sufficiently heated, it will again expand and permit the control switch 21 to close.

It will be understood that this provides a cyclic operation of the signalling device which will continue so long as contacts 32—33 remain closed, that is as a stalling condition exists. When the laminar air flow over the wing surface is again established, sufficient pressure is again developed by the pressure differential device 15 to cause the pressure switch to open and remain in the position, as shown in Figs. 3 and 4.

While the switch device 16 is shown as being positioned directly under the head 15, it will be understood that it may be located in any other suitable position so long as it is subjected to the pressure differential produced by the head.

Due to the nature and construction of the switch device 16, it is unaffected by wide variations in temperature, humidity, altitude, or operating position. It is not appreciably affected by vibration as there is a thermal lag in the heating of the wire which causes a slight interval of the order of a small fraction of a second between the time the pressure switch 22 is closed, and the signalling devices are operated. Under severe conditions of vibration, the pressure switch may close momentarily without operating the signalling devices and giving a false warning.

While not shown it is to be understood that the switch device 16 may be provided with ambient temperature compensation by means of a second expansible wire and a flexible or spring support for the wires, as shown in my copending application Serial No. 30,305, filed June 1, 1948, now abandoned.

In view of the foregoing description of a preferred embodiment of our device, it will be apparent that we have provided a stall detecting device and warning system which is of relatively simple and economical construction and extremely reliable and effective under widely varying operating conditions. It is so constructed that it is not appreciably affected by vibration or operating position and also that, in the case of failure of the device itself, it fails in a safe position, that is, in such manner as to operate the signalling devices and warn the pilot. Such failure may result from breaking or excessive elongation of the wire or loss of differential pressure, as from clogging of the inlet opening of the pressure differential device. It is of extremely simple mechanical design and comprised of a minimum number of parts since an additional control switch or relay is not required to control the heating current of the expansible wire as this current is controlled directly by the bellows-actuated switch.

While we have shown a concrete embodiment of our invention and described it in detail, it is to be understood that the principles of our invention may be embodied in other forms without departing from the spirit of our invention.

We claim as our invention:

1. Stall warning apparatus for airplanes comprising, an electrically-operated warning device, an energizing circuit for said warning device including a control switch for controlling the energization of the warning device, means including an electrically-heated expansible element connected to mechanically actuate the control switch, a heating circuit for said element, switch means operated by said control switch for controlling said heating circuit, and means including a pressure switch responsive to variations in pressure differential resulting from changes in air flow conditions over the upper surface of the wing for actuating said switch means.

2. Stall warning apparatus for airplanes comprising, an electrically-operated warning device, an energizing circuit for said device, a control switch for said circuit, said control switch being of the single point double throw type with normally closed and normally open contact members, said energizing circuit of the warning device extending through the normally closed contact members, an expansible element connected to mechanically actuate the control swtich, said element being disposed to normally hold the control switch in an operated position such that its normally closed contact members are open and its normally open contact members closed, a heating circuit for said element extending through the normally open contact members of the control switch, and pressure responsive switch means controlled in accordance with air flow conditions over the upper surface of the wing of the plane for controlling the heating circuit, whereby the heating circuit is closed and the element heated and expanded in response to an incipient stalling condition to effect the operation of the control switch to operate the warning device to indicate such condition to the pilot of the plane.

3. Stall warning apparatus for airplanes comprising, an electrically-operated warning device, an energizing circuit for said device, a control switch for said circuit, said control switch being of the single point double throw type with normally closed and normally open contact members, said energizing circuit of the warning device extending through the normally closed contact members, an expansible wire connected to mechanically actuate the control switch, said wire being disposed to normally hold the control switch in an operated position such that its normally closed contact members are open and its normally open contact members closed, a heating circuit for said wire extending through the normally open contact members of the control switch, pressure responsive switch means including relatively movable contact members for controlling the energization of the heating circuit, and means responsive to the direction of air flow over the surface of a wing of the plane for producing a pressure differential in accordance therewith for controlling the operation of the pressure responsive switch means, whereby the contact members of said pressure switch means are held open under normal flight conditions and are closed in response to an incipient stalling condition of the wing to effect the heating and expansion of the wire and operation of the control switch to operate the warning device.

4. A stall detector and control device for aircraft comprising, means adapted to be mounted on the upper surface of the wing for supplying a pressure differential in accordance with the direction of air flow over said wing surface, a control switch for controlling a circuit, said switch being of the double throw type having normally open and closed contact members, an electrically-heated expansible wire connected to normally hold the control switch in one actuated position with the normally closed contact members open and the normally open contact members closed, a heating circuit for the expansible wire including the normally open contact members of the control switch, and a pressure responsive switch connected to the means adapted to be mounted on the upper surface of the wing to be responsive to said pressure differential for controlling the heating circuit.

5. A switch device for use on an airplane in stall warning systems comprising, a control switch, an electrically-heated expansible member connected to mechanically actuate the control switch, and a bellows-actuated switch device responsive to variations in pressure differential for controlling the heating of the expansible member, said switch device having cooperating contact members one of which is carried by the bellows and the other of which is mounted on an arm which is movable in response to variations in gravitational pull and having a mass corresponding to that of said bellows, whereby said cooperating contacts retain substantially constant open circuit spacing irrespective of altitude.

6. A signalling device comprising, an electrically operated signalling means, an energizing circuit for said signalling means, electro-thermal means for actuating the control switch, a heating circuit for said electro-thermal means, control switch means in both of said circuits and having two positions where said circuits are energized, respectively, said control switch means being biased to its position where the circuit for said signalling device is energized but normally held by said electro-thermal means at its other position where it closes the energizing circuit for said electro-thermal means, additional switch means in the energizing circuit for said electrothermal means, and means subject to a variable condition and being responsive to a predetermined value of said condition for closing said additional switch means.

7. A pressure responsive switch for use on airplanes or the like comprising, a switch device, a bellows for actuating said switch device, said switch device having cooperating contact members one of which is carried by the bellows and the other of which is mounted on an arm which is movable in response to variations in gravitational pull and having a mass corresponding to that of said bellows, whereby said cooperating contacts retain substantially constant open circuit spacing irrespective of altitude.

HOWARD E. DYCHE, Jr.
GILBERT P. CARDWELL.

References Cited in the file of this patent
UNITED STATES PATENTS

| Number | Name | Date |
|---|---|---|
| Re. 23,042 | Upson | Oct. 5, 1948 |
| 1,615,677 | Billhimer | Jan. 25, 1927 |
| 1,997,011 | O'Donovan | Apr. 9, 1935 |
| 2,057,384 | Lamb | Oct. 13, 1936 |
| 2,116,960 | Brown | May 10, 1938 |
| 2,297,412 | Hoppe | Sept. 29, 1942 |
| 2,356,847 | Holthe | Aug. 29, 1944 |
| 2,373,088 | Allen | Apr. 10, 1945 |
| 2,385,616 | Eaton | Aug. 25, 1945 |
| 2,450,450 | Schmidinger | Oct. 5, 1948 |
| 2,454,587 | Arnold | Nov. 23, 1948 |